B. F. BURKE.
ARTIFICIAL BAIT FOR FISH.
APPLICATION FILED OCT. 17, 1908.

913,102.

Patented Feb. 23, 1909.

Witnesses

Inventor
Benjamin F. Burke.
By
Attorney

UNITED STATES PATENT OFFICE.

BENJAMIN F. BURKE, OF CHICAGO, ILLINOIS, ASSIGNOR OF ONE-HALF TO MATTHEW CORBETT, OF CHICAGO, ILLINOIS.

ARTIFICIAL BAIT FOR FISH.

No. 913,102.      Specification of Letters Patent.      Patented Feb. 23, 1909.

Application filed October 17, 1908. Serial No. 458,224.

*To all whom it may concern:*

Be it known that I, BENJAMIN F. BURKE, citizen of the United States, residing at Chicago, in the county of Cook and State of Illinois, have invented certain new and useful Improvements in Artificial Bait for Fish, of which the following is a specification.

This invention relates to artificial bait for fish, and has for its object to provide an artificial bait with an improved spring hook construction whereby when the bait is taken by the fish a hook or hooks will spring out in position for action, the hooks being normally concealed or held within the bait.

The device is particularly adapted for use in trolling, as it is weedless, the points of the hook being protected, and it can be used in clear water with the hook exposed.

The invention is illustrated in the accompanying drawing, in which—

Figure 1:
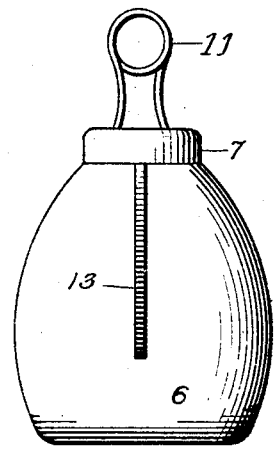
Figure 2:
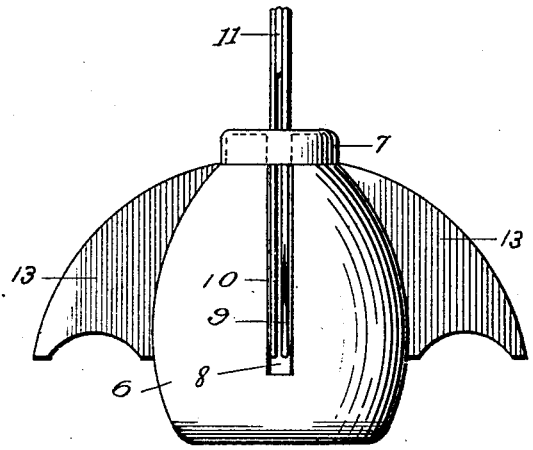
Figure 3:
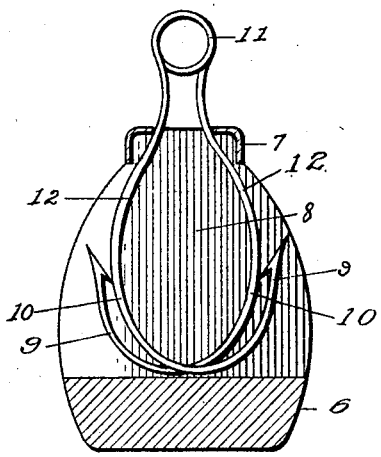
Figure 4:
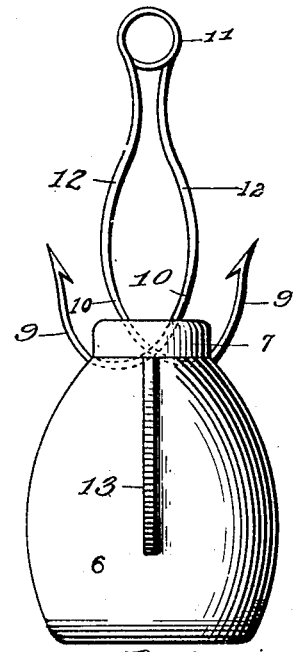

Figure 1 is a plan view of the device; Fig. 2 is a side view; Fig. 3 is a longitudinal section; Fig. 4 is a plan view with the hooks exposed.

Referring specifically to the drawings, 6 indicates the body of the bait which may be made of any suitable material and in any desired shape. As shown, it is oval in form, and at the front end thereof has a ring 7 fixed thereto. The body has a recess or slot 8 cut across through the same and arranged to contain the hooks 9. Two hooks are shown having spring shanks 10 which are bowed out with respect to each other, being connected at the front ends by a spring coil 11. The spring tends to separate or project the hooks laterally, the shanks of the hooks pressing against the ring 7, said shank being thickened, as indicated at 12, to stand the wear incident to the operation of the hooks. The body is also provided with two wings 13, on opposite sides, so as to hold the bait in proper position in the water; that is, the flanges will lie in horizontal position with the hooks in vertical position.

In operation, the hooks are normally pushed back into the body, as shown in Fig. 3, in which event the points of the hooks will lie within the surface of the body and consequently will not be exposed. When the bait is taken by a fish the pull on the bait will cause the hooks to advance, thereby pulling the hooks forwardly out of the slot 8, the spring at the same time causing them to spring out slightly to hook the fish. The bait is reset by pressing the hooks back to former position.

The bait has decided advantages due to the fact that the hooks are concealed and also to the fact that it is weedless and that the hooks have a spring action when the bait is taken.

It will be seen that the bowed shape of the shanks of the hooks, and the spring, causes the hooks to be yieldingly held in either retracted or advanced position, and they will not be advanced except in consequence of special pull incident to a bite, and after being advanced will not be retracted except by special inward push.

I claim:

1. An artificial bait comprising a recessed body with a ring at the front end, and hooks concealed in the recess when set and having spring shanks movable in and out in the ring and bearing against the same to yieldingly retain the hooks in retracted or advanced position with respect to the bait.

2. An artificial bait comprising a recessed body with a ring at the front end, and oppositely disposed hooks in the recess having bowed shanks slidable through the ring and connected by a spring tending to spread the hooks, the point of the hooks being within the surface line of the body when the hooks are retracted and beyond the same when the hooks are advanced.

3. An artificial bait comprising a tapered body having a cross slot and a ring at the front end thereof, and oppositely presented hooks in the slot, having curved shanks extending and movable in and out through the ring and connected by a spring at the front end tending to spread the hooks, the points of the hooks being within the surface of the body when they are retracted, and exposed when advanced.

In testimony whereof, I affix my signature in presence of two witnesses.

BENJAMIN F. BURKE.

Witnesses:
     NELLIE FELTSKOG,
     H. G. BATCHELOR.